(12) United States Patent
Fukamachi et al.

(10) Patent No.: US 6,457,652 B1
(45) Date of Patent: Oct. 1, 2002

(54) THERMOSTAT

(75) Inventors: Masatoshi Fukamachi, Wako (JP); Takahiro Iwaki, Kiyose (JP); Masahiro Aburakawa, Kiyose (JP)

(73) Assignees: Honda Giken Kogya Kabushiki Kaisha, Tokyo (JP); Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 09/492,450

(22) Filed: Jan. 27, 2000

(30) Foreign Application Priority Data

Jan. 27, 1999 (JP) .............................. 11-017924

(51) Int. Cl.$^7$ .................................. F01P 7/16
(52) U.S. Cl. ...................................... 236/34.5
(58) Field of Search .................. 236/34.5, 34

(56) References Cited

U.S. PATENT DOCUMENTS

| | | | |
|---|---|---|---|
| 3,246,637 A | * 4/1966 | Walsh | 236/34 |
| 3,313,483 A | * 4/1967 | Nallinger | 236/34.5 |
| 3,700,166 A | * 10/1972 | Foults | 236/34.5 |
| 4,196,847 A | * 4/1980 | Gobien | 236/34.5 |
| 4,344,564 A | * 8/1982 | Magnuson | 236/34.5 |
| 4,425,877 A | * 1/1984 | Fritzenwenger et al. | 236/34.5 |
| 5,292,064 A | * 3/1994 | Saur et al. | 236/34.5 |
| 5,791,557 A | * 8/1998 | Kunze | 236/34.5 |
| 5,979,778 A | * 11/1999 | Saur | 236/34.5 |

* cited by examiner

*Primary Examiner*—William E. Tapolcai
(74) *Attorney, Agent, or Firm*—Oblon, Spivak, McClelland, Maier & Neustadt, P.C.

(57) ABSTRACT

A thermostat 1 which placed in a cooling fluid channel of an internal combustion engine and which controls the flow of a cooling fluid within the cooling fluid channel depending upon a change in the temperature is disclosed. The thermostat has a cylindrical valve body 17 having an inlet opening 17a, an outlet opening 17b, and a bypass opening 17g formed on the circumference surface thereof and fixed at the position where the inlet opening and the outlet opening are communicated with the cooling fluid channel, a fluid channel area FA which communicates the inlet opening with the outlet opening, a thermo valve 7 having a piston 16 which goes forward and backward according to the actions of a thermal expansion element 15a a spring member 6 at one side, and having a valve element 12 which moves forward and backward across the fluid channel area whereby the thermo valve slides within the valve body due to the movement of the piston, and a bypass valve element 20 which stands parallel to the movement of the piston at another side of the thermo valve and which can be inserted into a bypass channel. The valve element opens or closes the inlet opening and the outlet opening due to the movement of the bypass valve element together with the piston to communicate or block said fluid channel area, and the valve element opens or closes the bypass opening and the bypass valve element opens or closes the bypass channel to communicate or block the bypass opening and the bypass channel.

12 Claims, 7 Drawing Sheets

THERMOSTAT

FIELD OF THE INVENTION

The present invention relates to a thermostat for cooling an engine, and particularly to a thermostat which can prevent blurring of the shaft of the piston.

BACKGROUND OF ART

At present, as commercially available cooling systems for engines, most of the systems are types which cool the engines by water-cooling. The water-cooled system prevents overheating due to the heating of the engine and prevents overcooling of the engine in cold times, always keeping the engine at an optimal temperature.

Figure 6:
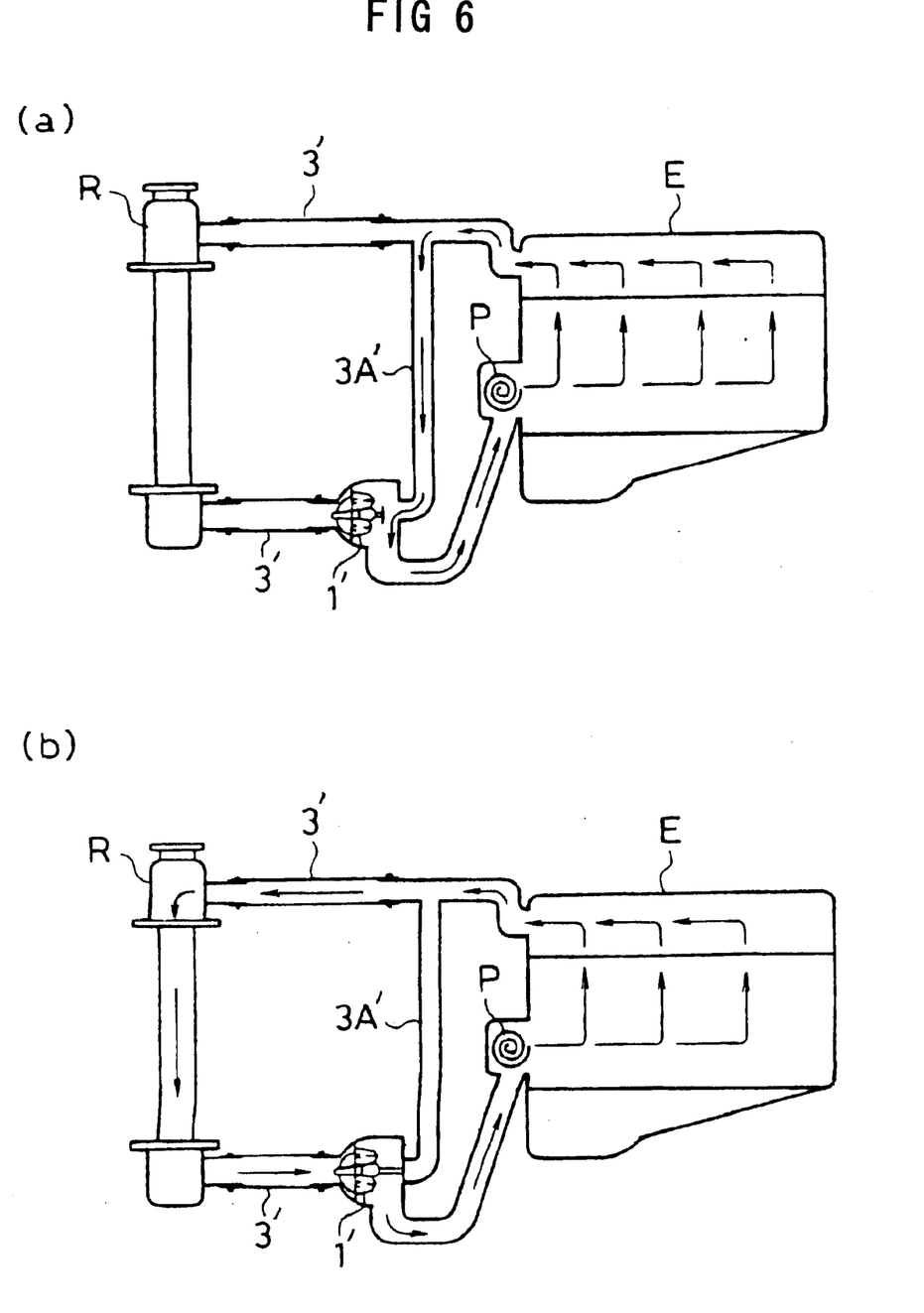
FIG. 6 is an explanatory view of a cooling fluid channel of a general engine.

As shown in FIG. 6, in the cooling system by water-cooling, a radiator R is placed outside of an engine E, and the radiator R and the engine E are connected by means of a rubber hose, etc. to circulate a cooling fluid. The main configuration is composed of the radiator R, which plays a role as a heat exchanger, a water pump P, which forcedly feeds the cooling fluid from the engine E to the radiator R, a thermostat 1', which controls the flow of the cooling fluid to or from the radiator R depending upon a change in the temperature of the cooling fluid to keep the temperature of the cooling fluid at an optimal level, and a rubber hose etc., which forms a circulation channel for the cooling fluid. When the cooling fluid is higher than a prescribed temperature, the thermostat 1' feeds the cooling fluid, which has been cooled by the radiator R, to the engine E via a cooling fluid channel 3'. When the cooling temperature is lower than a prescribed temperature, as in the case of starting the engine E, the thermostat 1' circulates the cooling fluid within the engine E via a bypass channel 3A'. Such a water-cooled system for cooling an engine is utilized in an engine for a two-wheeled vehicle as well as an engine for four-wheeled vehicle.

As shown in FIG. 6, from the time of starting the engine E to warming the engine E to an optimal temperature, the thermostat 1' closes the cooling fluid channel 3'. In other words, the cooling fluid from the engine E does not goes toward the radiator R, but passes through the bypass channel 3A' and circulates within the engine E (see the arrow in FIG. 6 (*a*)), which makes the temperature of the engine reach an optimal level within a short period of time. On the other hand, as shown in FIG. 6 (*b*), after the temperature of the engine E attains an optimal level, a valve element 12' of the thermostat 1' is opened (see FIG. 7), to thereby open the cooling fluid channel 3' at the side of the radiator R. Then, the cooling fluid passes through the radiator R and circulates within the engine E (see the arrow in FIG. 6 (*b*)), keeping the temperature of the engine cooled down at an optimal level.

Figure 7:
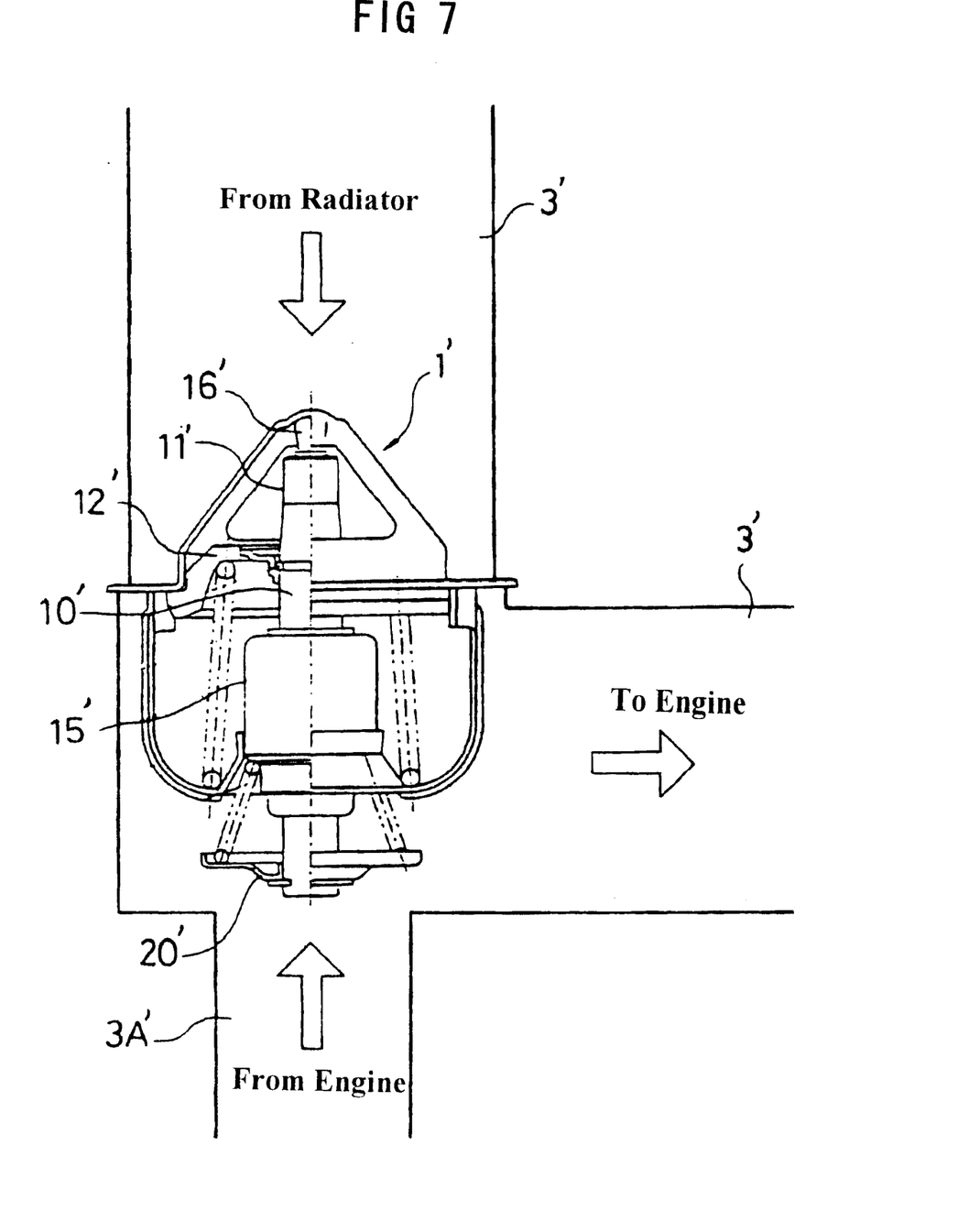
FIG. 7 is a partial cross sectional view showing the thermostat of FIG. 6.

As shown in FIG. 7, in the conventional thermostat 1', a guide portion 11' of an element 10' is not fixed by a supporting member, or anything else. and, thus, when a piston 16' which is guided by the guide portion is extended, the piston 16' sometimes extends in the state of blurring the shaft. If the piston 16' is extended in such a state, there arises a tendency to wear the piston 16' and the guide portion 11' in a bias manner and a gap would occurs between the piston 16' and the guide portion 11'. In addition, since the thermostat 1' is placed in a manner that it is always soaked in the cooling fluid within the cooling fluid channel 3', the cooling fluid is sometimes leaks into the gap formed between the piston 16' and the guide portion 11', and the dust and dirt existing in the cooling fluid sometimes penetrate into the gap.

As described above, if the piston blurs the shaft while advancing and retreating, it is liable to wear the piston 16' and the guide portion 11' in a bias manner, making it difficult to enhance the durability of the thermostat 1'.

SUMMARY OF THE INVENTION

An object of the present invention is, therefore, to provide a thermostat which can prevent the blurring of the shaft and which excels in durability.

According to the present invention, such an object is attained by a thermostat, which is placed in a cooling fluid channel of an internal combustion engine and which controls the flow of a cooling fluid within the cooling fluid channel depending upon a change in the temperature, said thermostat having a cylindrical valve body having an inlet opening, an outlet opening, and a bypass opening formed on the circumference surface thereof and fixed at the position where said inlet opening and said outlet opening are communicated with the cooling fluid channel, a fluid channel area which communicates said inlet opening with said outlet opening within said valve body, a thermo valve having a piston which goes forward and backward according to the actions of a thermal expansion element within a thermal-sensitive member and the function of a spring member at one side, and having a valve element which moves forward and backward across said fluid channel area whereby said thermo valve slides within the valve body due to the movement of the piston, and a bypass valve element which stands parallel to the movement of the piston at another side of said thermo valve and which can be inserted into a bypass channel;

said valve element opening or closing said inlet opening and said outlet opening due to the movement of said bypass valve element together with said piston to communicate or block said fluid channel area, and said valve element opening or closing the bypass opening and said bypass valve element opening or closing the bypass channel to communicate or block the bypass opening and the bypass channel.

According to the thermostat of the present invention, since the thermo valve having the piston and the bypass valve are unified with each other, the bypass valve moves forward or backward according to forward or backward movement of the piston. What is more, since the bypass valve is inserted into the bypass channel by the extension of the piston, the piston can extend without blurring of the shaft.

BEST MODES FOR CARRYING OUT THE INVENTION

Figure 1:
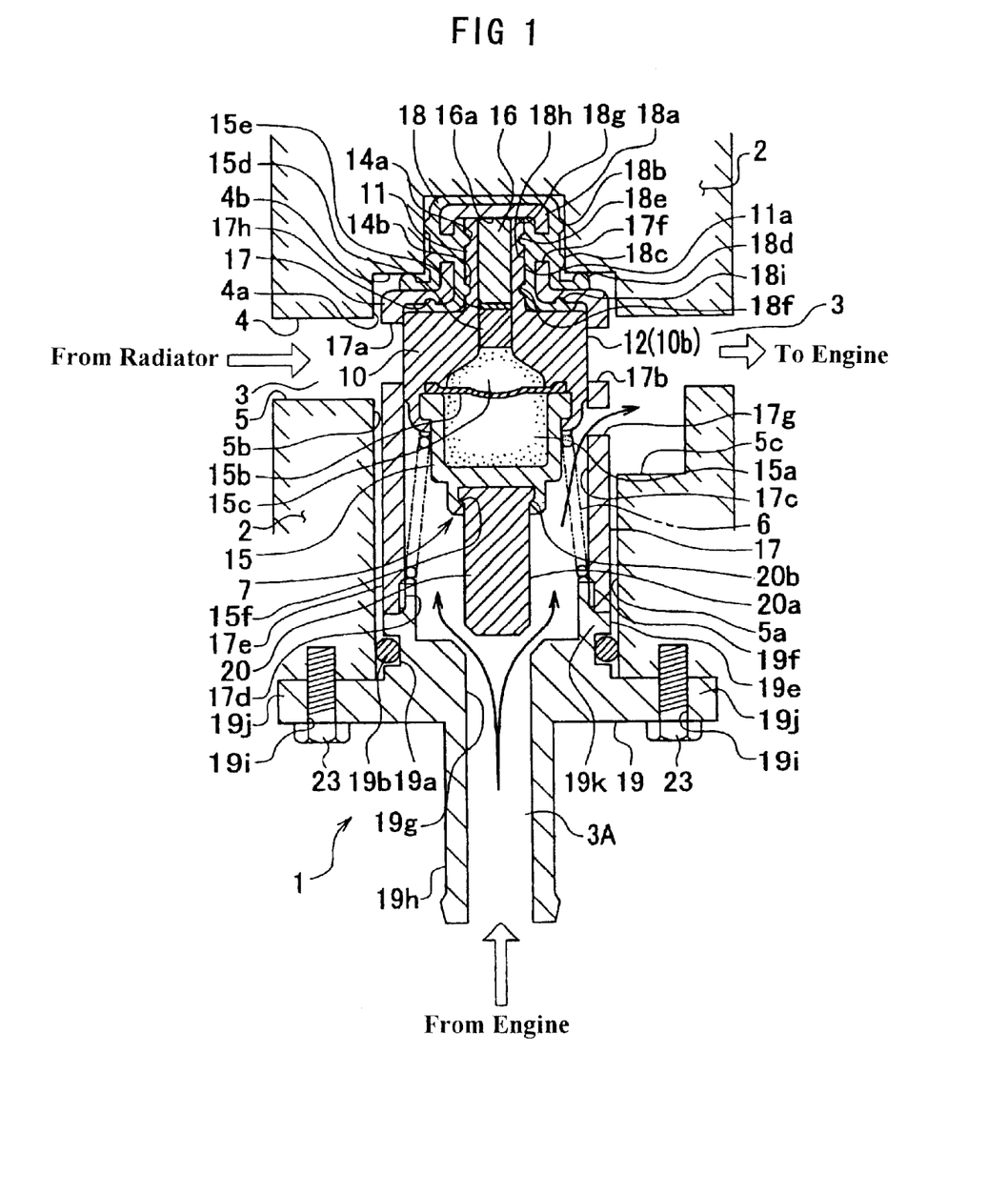
FIG. 1 is a cross sectional view showing the closed state of the valve in a thermostat according to a first embodiment of the present invention.
Figure 2:
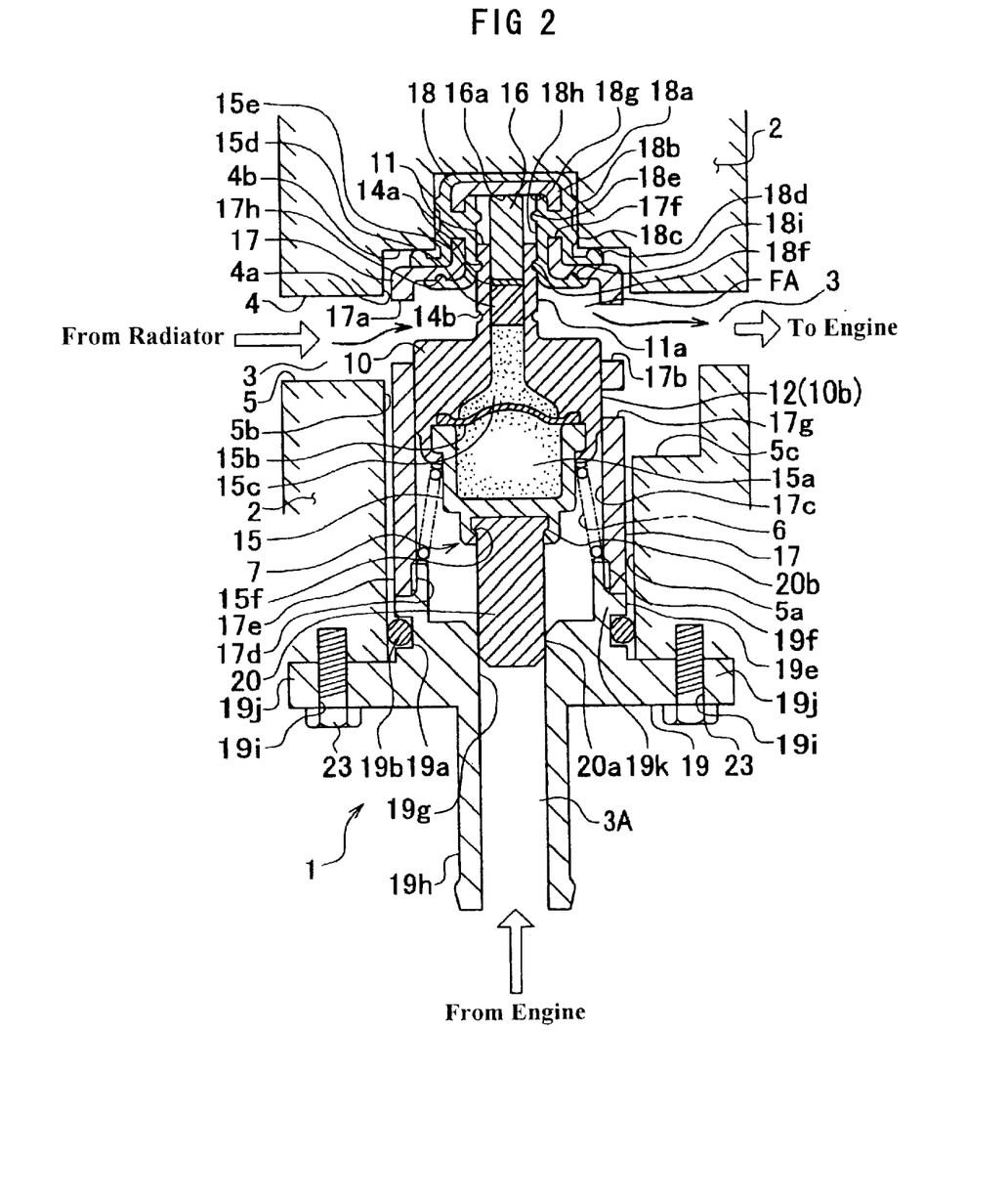
FIG. 2 is a cross sectional view showing the opened state of the valve in the thermostat according to the first embodiment of the present invention.
Figure 3:
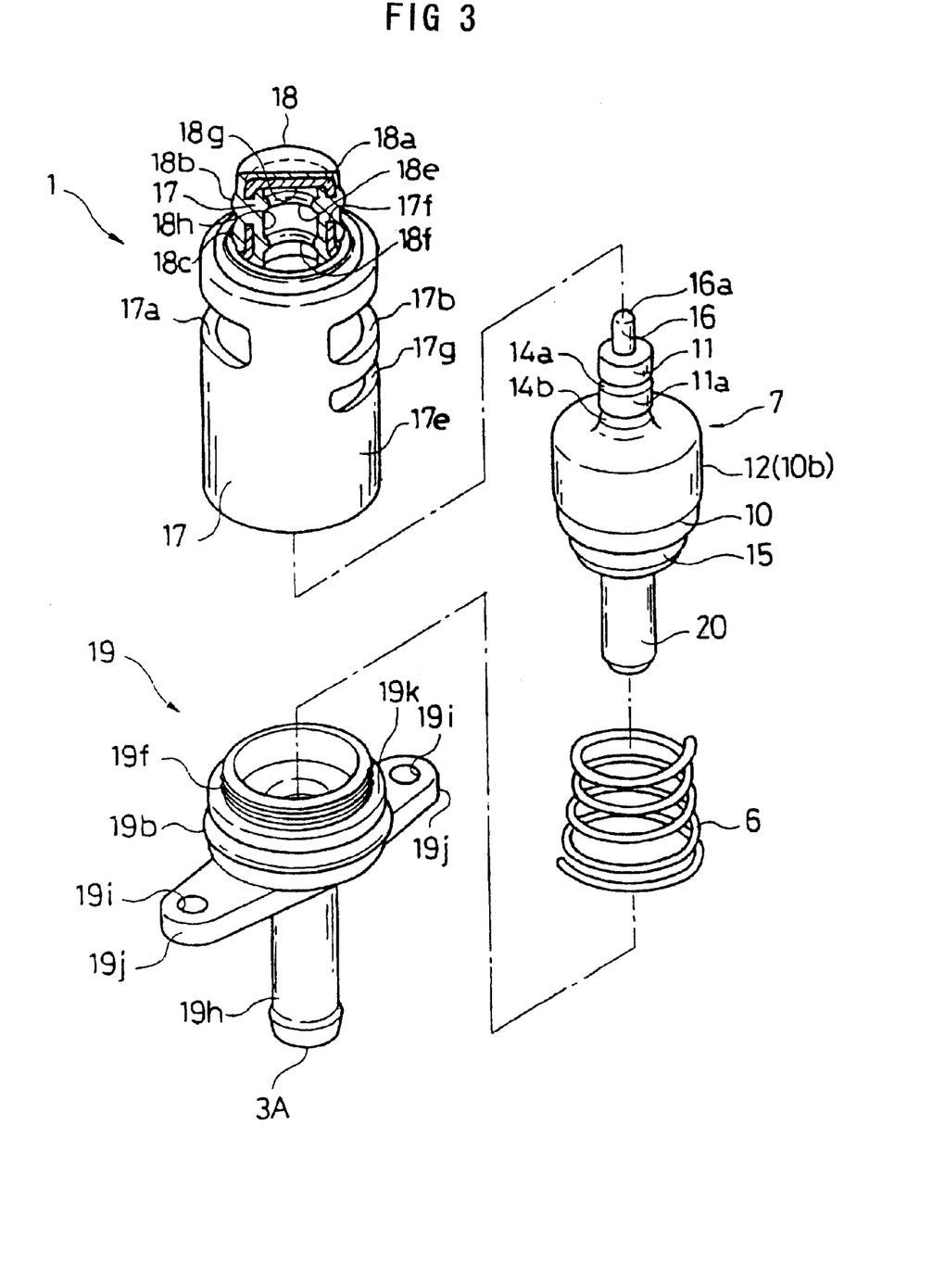
FIG. 3 is an exploded perspective view showing main portions of the thermostat according to the first embodiment of the present invention.

A thermostat according to a first embodiment of the present invention will now be described by referring to FIGS. 1 to 3. FIG. 1 is a cross sectional view showing the closed state of the valve in a thermostat according to a first embodiment of the present invention, FIG. 2 is a cross sectional view showing the opened state of the valve in the thermostat according to the first embodiment of the present invention, and FIG. 3 is an exploded perspective view showing main portions of the thermostat according to the first embodiment of the present invention.

A thermostat placed within the cooling fluid channel for an engine head will now be described. However, the position for placing the thermostat is not restricted to the engine head, and the thermostat of the present invention may be placed at any place within the cooling fluid channel. For example, similar functions and similar effects can be obtained if the thermostat of the present invention is placed at the engine block, in the interior of the radiator, at the branched portion of the bypass channel and the like.

A thermostat 1 is fixed onto a bored pore 4a formed on the upper surface 4 of a cooling fluid channel 3 of an engine head 2 and a bored pore 5b formed on the lower surface 5 of the cooling fluid channel 3 of the engine head 2 and is placed (embedded) crossing the cooling fluid channel 3 and at the position communicated with the bypass channel 3A. In order to secure the flow of the cooling fluid from a bypass opening 17, a stepped wall surface 5c is formed on the bored pore 5a. The thermostat 1 controls the flow of the cooling fluid flowing through the cooling fluid channel 3 depending upon a change in the temperature of the cooling fluid.

The thermostat 1 is mainly composed of a hollow and cylindrical valve body 17, a thermo valve 7 which slides in contact with the hollow portion of the valve body 17 and is stored in the hollow portion of the valve body 17, a cap member 18 which is inserted into one end of the valve body 17, a joint cover 19 which is inserted into another end of the valve body 17, a coil spring 6 serving as a spring member, which applies a resilient force to the thermo valve 7, and a bypass valve element 20, which opens or closes the bypass channel 3A. The thermo valve 7 is mainly composed of an element 10 comprising a valve element 12 for communicating or blocking the flow of the cooling fluid and a guide portion 11 for guiding the movement of the piston 16, a wax case 15 serving as a thermal-sensitive portion, which is placed on a bottom side of the element 10, a wax 15a serving as a thermal expansion element, which is stored within the wax case 15, and a piston 16.

The parts making up the thermostat 1 will now be described herein below.

(1) Valve Body 17

The valve body 17 possesses a major diameter which can be inserted into the stepped wall surface 4b of the bored pore 4a formed on the upper surface 4 of the cooling fluid channel 3 of the engine head 2, and the inner wall surface 5b of the bored pore 5a formed on the lower surface 5. The valve body 17 has a hollow, cylindrical shape, both ends of which are opened. On a circumference 17e of the valve body 17, an inlet opening 17a and an outlet opening 17b for the cooling fluid are formed opposite each other and a bypass opening 17g is formed at a lower portion of the outlet opening 17b. By means of the inlet opening 17a, the outlet opening 17b, and the element 10 (valve element 12), etc., the main channel of the cooling fluid channel 3 (the cooling fluid channel 3 from the side of the radiator to the side of the engine) is communicated or blocked. On the other hand, by means of the bypass opening 17g, the bypass valve element 20, etc., the cooling fluid is caused to circulate within the engine via the bypass channel 3A and not via the radiator at the time when the temperature of the cooling fluid is low or before the engine is warmed up well.

When the element 10 (the valve element 12) descends in a slidable manner, the inlet opening 17a and the outlet opening 17b are opened to be communicated with a fluid channel area FA (see FIG. 2), whereby the cooling fluid within the cooling fluid channel 3 flows from the radiator side to the engine side. Furthermore, at this time, the bypass opening 17g is closed, and the bypass valve element 20 closes the bypass channel 3A, whereby the flow of the cooling fluid from the bypass channel 3A to the engine side is blocked (see FIG. 2).

On the other hand, when the element 10 (valve element 12) ascends in a slidable manner, the fluid channel area FA is blocked to close the inlet opening 17a and the outlet opening 17b, whereby the flow of the cooling fluid of the main channel of the cooling fluid channel 3 is blocked. Moreover, the bypass opening 17g is opened, and the bypass valve element 20 opens the bypass channel 3A, whereby the cooling fluid flows from the bypass channel 3A to the engine side (see FIG. 1).

When the thermostat 1 is fixed onto the engine head 2, the valve body 17 should be fixed at the position where the inlet opening 17a and the outlet opening 17b opening the cooling fluid channel 3 (i.e., the position to be communicated with the cooling fluid channel 3). Furthermore, the thermostat 1 is placed so that the bypass opening 17g is opened at the side having the stepped wall surface 5c for the bypass of the bored pore 5a. The open areas of the inlet opening 17a and the outlet opening 17b should be big enough for securing the flow amount of the cooling fluid flowing in the cooling fluid channel 3. On the other hand, the open area of the bypass opening 17g should be big enough for securing the flow amount of the cooling fluid flowing in the bypass channel 3A.

The term "fluid channel area FA" used herein means a fluid channel area formed within the valve body 17 by which the element 10 (valve element 12) descends in a slidable manner to open the inlet opening 17a and the outlet opening 17b.

An end circumference 17f of the valve body 17 is formed so as to be engaged with the stepped wall surface 4b of the bored pore 4a, and is inserted into the bored pore 4a of the upper surface 4. Furthermore, onto the end circumference 17f, a cap member 18, which is described later on, is fixed, for example, by baking.

A screw portion 17d is formed in an inner wall surface 17c of another end portion of the valve body 17, and is screwed with a screw portion 19f of the joint cover 19, which is described later on. Screwing the valve body 17 with the joint cover 19 makes it possible to adjust the set length of the valve body 17 and the joint cover 19. Furthermore, by screwing the valve body 17 with the joint cover 19, the valve body 17 and the joint cover 19 are unified with each other, making it easy to fix the thermostat 1 to the engine head 2.

In determining the material of the valve body 17, the environment to be installed, i.e., the thermal conductivity from the engine head 2 and mechanical processability, should be taken into consideration, and any material can be used as long as it adapts to such conditions.

(2) Thermo Valve 7

The thermo valve 7 slides in contact with the inner wall surface 17c of the valve 17 and is inserted thereinto. The thermo valve 7 is composed of the wax case 15 for storing the wax 15a serving as a thermal expansion element, a diaphragm 15b which transmits the expansion or shrinkage of the wax 15a to a semi-fluid 15c of an upper layer, the semi-fluid 15c which transmits the follow-up movement of the diaphragm 15b to a rubber piston 15d of an upper layer, the rubber piston 15d, a backup plate 15e which transmits the follow-up movement of the semi-fluid to the piston 16 of an upper layer, the piston 16, which pushes a metal fitting 18a of the cap member 18, and the element 10 which accumulates these configuration parts in a layered state and which serves as the valve element 12. The bypass valve element 20 stands at the bottom portion of the wax case 15.

An outer circumference surface 10b, which can slide in the inner wall surface 17c of the valve body 17, is formed on the element 10. The outer circumference surface 10b slides along the inner wall surface 17c of the valve body 17, and serves as the valve element 12 which opens or closes the inlet opening 17a, the outlet opening 17b, and the bypass opening 17g.

The element 10 opens or closes the inlet opening 17a, the outlet opening 17b, and the bypass opening 17g through the movement of the piston 16 due to the expansion or shrinkage of the wax 15a to be slid within the valve body 17.

The wax case 15 for storing the wax 15a is fixed at the bottom of the element 10, for example, by means of calking. The wax case 15 is fixed onto the bottom side and the inner side of the element 10 (valve element 12) and, thus, is never directly soaked in the cooling fluid flowing from the radiator side. For this reason, the change in the temperature of the cooling fluid flowing from the radiator side is transmitted via the element 10 (valve element 12).

At the side opposite the side of fixing the wax case 15 of the element 10, the guide portion 11 serving as a guide portion of the piston 16 is formed. In this embodiment, an outer circumference 11a of the guide portion 11 slides in contact with an inner surface 18h of the cap member 18.

Circular grooves 14a and 14b are caved onto the guide portion 11 along the circumference surface of the outer circumference 11a. The circular grooves 14a and 14b engage with a plurality of lip portions 18e and 18f projecting on the inner surface 18h of the cap member 18 to hold the cap member 18 in more secure manner. The engagement also prevents the penetration of the cooling fluid into the gap between the guide portion 11 and the cap member 18 and, thus, prevents the penetration of the cooling fluid into the gap formed between the guide portion 11 and the piston 16. Furthermore, since the cap member 18 holds the guide portion 11, it becomes possible to prevent the piston 16 from being extended in the state of blurring the shaft.

Moreover, since the thermo valve 7 transmits a change in the temperature of the cooling fluid from the cooling fluid channel 3 to the wax 15a within the wax case 15 via the valve element 12 of the element 10, the thermal sensitivity of the wax case 15 becomes milder, leading to a mild change in the expansion or shrinkage of the wax.

(3) Cap Member 18

The cap member 18 is in a hat form and is formed so that the convex portion thereof is inserted into the bored pore 4a of the engine head 2. Moreover, the cap member 18 is fixed onto the end circumference 17f of the valve body 17, for example, by baking.

Onto the outer circumference and outer edge portions of the cap member 18, projecting lip portions 18b, 18c, and 18d are projected. These lip portions 18b, 18c, and 18d are formed for the purpose of preventing the cooling fluid from penetrating into the engine head 2.

Moreover, lip portions 18e and 18f, which engage with the circular grooves 14a and 14b of the guide portion 11, project on the inner wall surface 18fh of the cap member 18 in a circular form. The engagement of the lip portions 18e and 18f with the circular grooves 14a and 14b prevents the cooling fluid from penetrating into the gap formed between the guide portion 11 and the piston 16 and also prevents the piston 16 from being slanted toward the shaft direction. With regard to the lip portions 18b, 18c, and 18d and lip portions 18e and 18f of the cap member 18, depending upon the expansion and lift stages of the piston 16, the number of the lips to be formed and the distance between the lips may of course be freely decided.

Due to the cap member 18 which is unified with the valve body 17, for example, by baking, and due to the engagement of the circular groove 17h with the lip portion 18i, which is provided on the surface of the valve body 17 in contact with the cap member 18, the penetration of dust, and the like into the piston 16 can also be prevented.

The material of the cap member 18 is not restricted as long as it excels in physical properties and mechanical properties such as heat resistance, wear and abrasion resistance, and is vibration proof. For example, when an elastic material like rubber is used as the material, such properties can be satisfied. The cap member 18 which has the heat resistance exhibits thermal insulating properties which shield the heat from the engine.

(4) Joint Cover 19

The joint cover 19 is in a flange form, and is composed of an inserting portion 19k, which is inserted into the bored pore 5a of the engine head 2, fixing members 19j and 19j, which are fixed on the engine head 2 and which are fixed by bolts 23 and 23, and a bypass channel portion 19h which is connected to the bypass channel 3A (not shown) within the engine room.

The inserting portion 19k has a hollow, cylindrical shape, and the hollow portion makes up the bypass channel 3A. A screwing portion 19f to be screwed with the screwing portion 17d of the valve body 17 is formed on the inserting portion 19k. By such screwing, the joint cover 19 is unified with the valve body 17. Furthermore, a groove portion 19a to be fitted with a seal ring 19b is formed on an outer circumference surface 19e of the inserting portion 19k. The seal ring 19b has the function of preventing the penetration of the cooling fluid, which otherwise could penetrate through the gap between the inner wall surface 5b of the bored pore 5a of the engine head 2 and the circumference surface 17e of the valve body 17.

The fixing members 19j and 19j have a shape like spreading both wings relative to the inserting portion 19k. To be specific, the fixing members 19j and 19j each has a flat shape that extends to both end portions of the inserting portion 19k in the direction perpendicular to the direction of moving the piston. The fixing members 19j and 19j have bolt pores 19i and 19i formed thereon, respectively.

The bypass channel portion 19h has a hollow, cylindrical shape and the hollow portion forms the bypass channel 3A. In addition, the bypass channel 3A of the bypass channel portion 19h is communicated with the hollow portion of the valve body 17.

By adjusting the screwing conditions between the screwing portion 17d and the screwing portion 19f, the resilient force of the coil spring 6 serving as a spring member can be increased or decreased. Moreover, by increasing or decreasing the resilient force, the opening conditions of the valve element 12 of the element 10 can be adjusted, making it possible to adjust the flow amount of the cooling fluid.

The method of connecting the valve body 17 with the joint cover 19 is not restricted to the screwing as described above. For example, similar functions and effects will be obtained, when a fastener, such as a C-ring, is used.

(5) Coil Spring 6 (Spring Member)

The coil spring 6 serving as a spring member for the thermo valve 7 is inserted into a gap between the joint cover 19 and the thermo valve 7. The coil spring 6 has the function of applying a resilient force to the thermo valve 7 in an upward direction, when the thermo valve 7 descends in a slidable manner within the valve body 17 due to a change in the temperature of the cooling fluid.

Changing the total height of the coil spring 6 makes it possible to apply changes in the conditions, such as the set actuation temperature of the thermostat 1, the flow amount, etc.

(6) Bypass Valve Element 20

The bypass valve element 20 has a column shape having a diameter so that it can be inserted into the bypass channel 3A of the joint cover 19. The bypass valve element 20 is engaged with the engaging portion 15f of the wax case 15, and stands on the bypass channel 3A of the joint cover 19. The bypass valve element 20 is standing in such a manner that its center shaft is accorded with the movement shaft of the piston 16. Consequently, according to the forward or backward movement of the piston 16, the bypass valve element 20 moves forward or backward on the same shaft.

The length of the shaft of the bypass valve element 20 is decided so that when the piston 16 contracts, the bypass valve element 20 can be detached from the bypass channel 3A and the bypass valve element 20 can secure a gap sufficient for the cooling fluid to flow from the bypass channel 3A, and that when the piston 16 expands, the bypass valve element 20 can be inserted into the bypass valve 3A and the bypass valve element 20 can block the flow of the cooling fluid from the bypass channel 3A.

When the piston 16 expands and the bypass valve element 20 is inserted into the bypass channel 3A, the bypass valve element 20 moves in such a manner that its outer circumference 20a slides along the inner wall surface 19g of the joint cover 19. In addition, as described above, the bypass valve element 20 moves together with the piston 20 on the same shaft. For this reason, when the piston 16 expands, the piston 16 can move in a stable state without slanting. As a result, when the piston 16 expands, the piston 16 and the guide portion 11 can be prevented from being worn in a bias manner, and dust etc. are never incorporated into the piston 16 and the guide portion 11.

The fitting of the thermostat 1 to the engine head 2 will now be described.

The thermostat 1, which is in the state where the valve body 17 and the joint cover 19 are unified with each other by screwing is fitted to the engine head 2. At the time of fitting, the thermostat 1 is fitted to the engine head 2 at the position where the inlet opening 17a, the outlet opening 17b and the bypass opening 17g of the valve body 17 can be opened to the cooling fluid channel 3. Furthermore, the thermostat 1 is placed so that the bypass opening 17g is opened at the side having the stepped wall surface 5c for the bypass of the bored pore 5a.

At this time, in the thermostat 1, the fixing portions 19j and 19j of the joint cover 19 are fixed on the engine head 2 to regulate the movement in the direction of sliding (the direction of movement the piston 16). Furthermore, bolts 23 and 23 are inserted into bolt pores 19i and 19i of the fixing portions 19j and 19j, and the thermostat 1 is fixed onto the engine head 2 by means of the bolts to regulate the rotation in the radial direction (the rotation direction as the axis of the piston 16). The unification of the valve body 17 with the joint cover 19 makes it easy to fit and detach the thermostat 1, decreasing the number of fitting operations. What is more, the fixation by means of the bolts makes it easy to align the inlet opening 17a, the outlet opening 17b, and the bypass opening 17g.

As described above, the thermostat 1 is arranged so that the piston 16 (valve element 12) moves in the direction crossing the flow direction of the cooling fluid of the cooling fluid channel 3. For this reason, a sufficient flow amount can be secured even if the diameter of the pipe of the cooling fluid 3 is not so long.

The thermostat 1 has the functions of shielding the cooling fluid flowing to the engine and of vibration proofing by means of the lip portions 18b, 18c, and 18d of the cap member 18 and the seal ring 19b of the joint cover 19.

The functions of the thermostat 1 will now be described by referring to FIG. 1 and FIG. 2.

(1) Functions of Thermostat 1 at the Time of Cooling fluid Having Low Temperature or of Starting Warming-up of Engine At the time when the cooling fluid has a low temperature or before the engine is warmed up, the temperature of the cooling fluid within the cooling fluid channel 3 is low, and the wax 15a within the wax case 15 is in a shrunken form. At this time, a resilient force is always applied to the thermo valve 7 in an upward direction by the coil spring 6. For this reason, the valve element 12 of the element 10 closes the inlet opening 17a and the outlet opening 17b of the valve body 17, and also opens the bypass opening 17g. In addition, the bypass valve element 20 opens the bypass channel 3A. To be specific, the fluid channel area FA is blocked and, thus, the cooling fluid never flows from the radiator side to the engine side. On the other hand, the bypass channel 3A and the bypass opening 17g are communicated with each other via the hollow portion of the valve body 17 and, thus, the cooling fluid flows from the bypass channel 3A to the engine side (see the arrow in FIG. 1). Consequently, the cooling fluid is circulated within the engine not via the radiator (see FIG. 1).

The temperature of the engine is increased with the elapse of the time and, thus, the temperature of the cooling fluid within the cooling fluid channel 3 is increased accordingly. This makes the wax 15a within the wax case 15 expand, and increase its volume. At this time, a change in the temperature of the cooling fluid flowing from the bypass channel 3A is directly transmitted to the wax case 15, which is a thermal sensitive portion. Through the expansion of the volume of the wax 15a, the diaphragm 15b is deformed to an upward direction and, pushes the rubber piston 15d up via the semi-fluid 15c according to the move-up change of the diaphragm 15b. The moving up of the rubber piston 15d causes the piston 16 to be pushed up via the backup plate 15e. To be specific, the piston 16 will project out from the guide portion 11 of the element 10 (see FIG. 2).

However, since the contact portion 16a, which is an end of the piston 16, is in contact with the contact surface 18g of the metal fitting 18a of the cap member 18, the guide portion 11, and thus the element, actually descend. At this time, as the element 10 descends, the bypass valve element 20 is inserted into the bypass channel 3A of the joint cover 19. For this reason, when the piston 16 is extended, the piston 16 stably actuates without blurring the shaft.

In addition, the circular groove 14a of the guide portion 11 which engages with the lip portion 18e of the cap member 18 (see FIG. 1) descends along the inner wall surface 18h of the cap member 18, and finally engages with the lip portion 18f of the cap member 18 (see FIG. 2). The position of the lip portion 18f formed by the projection is a position for determining the final descending position of the element 10. On the way from the lip portion 18e to the lip portion 18f, another lip portion may be formed to enhance the prevention of the cooling fluid from the penetration into the gap portion between the guide portion 11 and the piston 16.

When the thermo valve 7 descends in a slidable manner, the valve element 12 of the element 10 causes the inlet opening 17a and the outlet opening 17b of the valve body, which are in closed states to be opened. To be specific, the fluid channel area FA is communicated so that the cooling fluid flows from the radiator side to the engine side (direction of the arrow in FIG. 2). Then, the cooling fluid, having been cooled by the radiator, passes through the cooling fluid channel 3 and flows into the engine. At this time, since the change in the temperature of the cooling fluid is transmitted to the wax case 15, which is a thermal sensitive portion, via the valve element 12 of the element 10, the cooling fluid having been cooled at the radiator side does not shrink the wax 15a suddenly.

When the thermo valve 7 ascends in a slidable manner, the valve element 12 of the element 10 causes the bypass opening 17 of the valve body 17, which is in the opened state, to be closed and the bypass valve element 20 closes the bypass channel 3A. To be specific, the bypass channel 3A and the bypass opening 17g are blocked and, thus, the cooling fluid never flows to the engine side via the bypass channel 3A (see FIG. 2). When the piston 16 expands, the bypass valve element 20 moves on the same axis as the piston 16 to be inserted into the bypass channel 3A, and the piston stably expands without blurring the shaft.

(2) Functions of Thermostat 1 according to Change in Temperature of Cooling fluid from High Temperature to Low Temperature When the engine is stopped, the actuation of the water pump is stopped, and the circulation of the cooling fluid within the cooling fluid channel 3 is also stopped. Then, with the elapse of time, the temperature of the cooling fluid is decreased. Subsequently, as the temperature of the cooling fluid becomes lower, the wax 15a, which has expanded, shrinks. At this time, since the temperature change of the cooling fluid flowing from the radiator side via the valve element 12 of the element 10 is transmitted to the wax case 15, which is a thermal-sensitive portion, the shrinkage of the wax 15a is brought about slowly. Furthermore, by means of the coil spring 6 which always applies a resilient force to the thermo valve 7 in an upward direction, the thermo valve 7 slides upwardly. As a result, the valve element 12 of the element 10 closes the inlet opening 17a and the outlet opening 17b of the valve body 17, which are in opened states, and opens the bypass opening 17g. In addition, the bypass valve element 20 opens the bypass channel 3A. To be specific, the fluid channel area FA is blocked and, thus, the cooling fluid never flows from the radiator side to the engine side. On the other hand, the bypass channel 3A and the bypass opening 17g are communicated with each other via the hollow portion of the valve body 17 and thus, the cooling fluid flows from the bypass channel 3A to the engine side (see the arrow in FIG. 1). Consequently, the cooling fluid is circulated within the engine not via the radiator (see FIG. 1).

Since the temperature change of the cooling fluid flowing from the radiator side is transmitted via the valve element 12 of the element 10 to the wax case 15, which is a thermal-sensitive portion, the volume of the wax 15a changes slowly. For this reason, the cooling fluid which has been cooled from the radiator side flows and, thus, the wax 15a never shrinks suddenly. As a result, it does not tend to generate the haunting phenomenon of the valve element 12 continuously and repeatedly opening and closing the outlet opening 17b and the inlet opening 17a.

Figure 4:
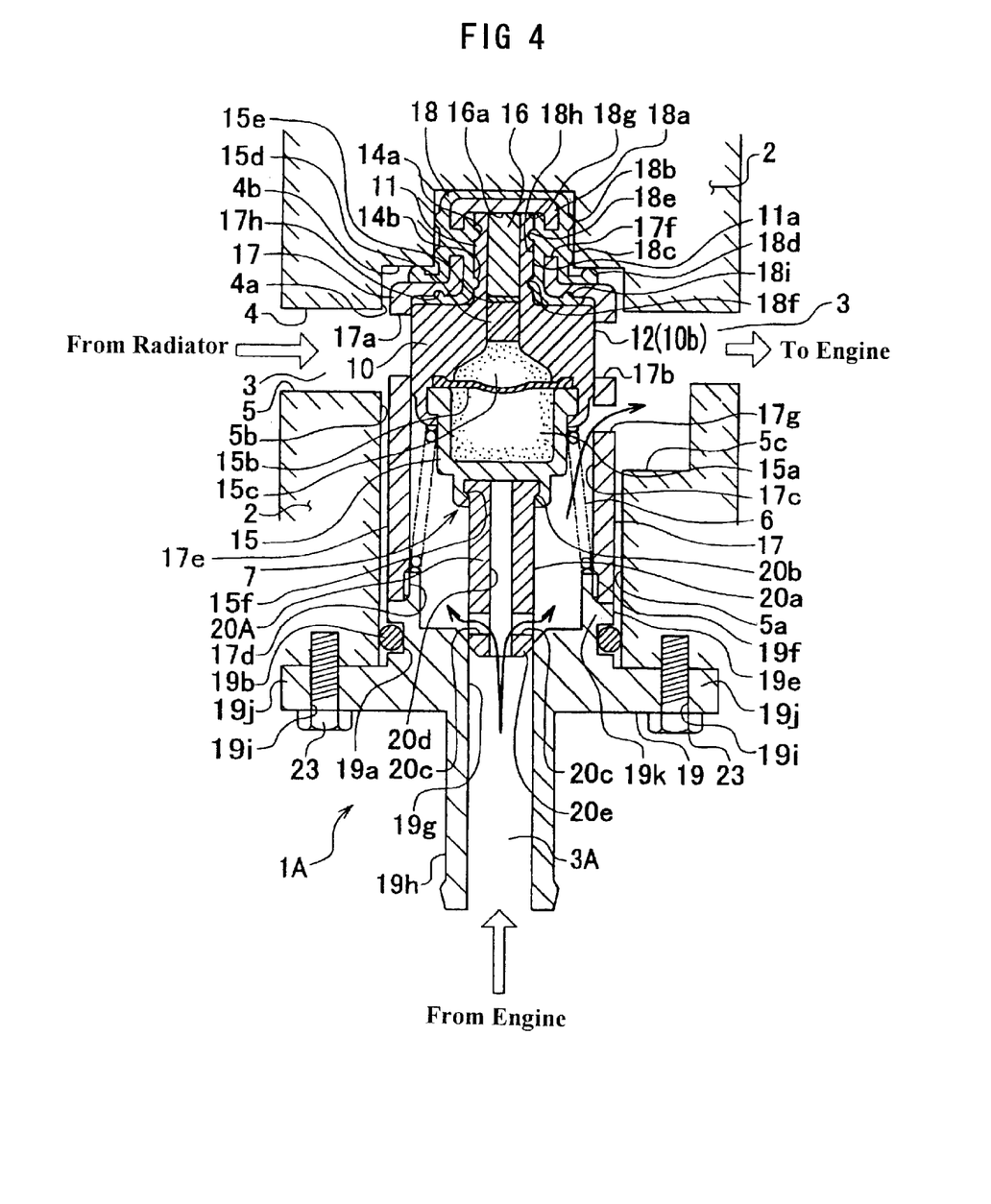
FIG. 4 is a cross sectional view showing the closed state of the valve in a thermostat according to a second embodiment of the present invention.

The thermostat according to the second embodiment of the present invention will now be described by referring to FIGS. 4 and 5.

In this embodiment, the basic configuration of the thermostat 1A is similar to that of the thermostat 1 according to the first embodiment, but the configuration and functions of the bypass valve element 20A are different from those of the thermostat 1 according to the first embodiment. With regard to the parts having the same configurations and the same functions used in this embodiment, the same symbols are used.

The thermostat 1A is fixed onto a bored pore 4a formed on the upper surface 4 of a cooling fluid channel 3 of an engine head 2 and a bored pore 5b formed on the lower surface 5 of the cooling fluid channel 3 and is placed (embedded) crossing the cooling fluid channel 3 and at the position communicated with the bypass channel 3A. In order to secure the flow of the cooling fluid from a bypass opening 17, a stepped wall surface 5c is formed on the bored pore 5a. The thermostat 1A controls the flow of the cooling fluid flowing through the cooling fluid channel 3 depending upon a change in the temperature of the cooling fluid.

The thermostat 1A is mainly composed of a hollow, cylindrical valve body 17, a thermo valve 7 which slides in contact with the hollow portion of the valve body 17 and is stored in the hollow portion of the valve body 17, a cap member 18 which is inserted into one end of the valve body 17, a joint cover 19 which in inserted into another end of the valve body 17, a coil spring 6 serving as a spring member, which applies a resilient force to the thermo valve 7, and a bypass valve element 20A, which opens or closes the bypass channel 3A. The thermo valve 7 is mainly composed of an element 10 comprising a valve element 12 for communicating or blocking the flow of the cooling fluid and a guide portion 11 for guiding the movement of the piston 16, a wax case 15 serving as a thermal-sensitive portion, which is placed on a bottom side of the element 10, a wax 15a serving as a thermal expansion element, which is stored within the wax case 15, and a piston 16.

The thermostat 1A described in the second embodiment has the same configuration as that of the thermostat 1A described in the first embodiment except for the bypass valve element 20A. The configuration different from that of the thermostat 1 will now be described.

Bypass Valve Element 20A

The bypass valve element 20A has a column shape having a diameter so that it can be inserted into the bypass channel 3A of the joint cover 19. The bypass valve element 20A is engaged with the engaging portion 15f of the wax case 15, and stands on the bypass channel 3A of the joint cover 19. The bypass valve element 20A is standing in such a manner that its center shaft is accorded with the movement shaft of the piston 16. Consequently, according to the forward or backward movement of the piston 16, the bypass valve element 20A moves forward or backward on the same shaft.

Bypass pores 20c and 20c, which communicate the outer surface 20a of the bypass valve element 20A with the hollow portion 20d, are provided into the bypass valve element 20A. The bypass pores 20c and 20c are provided perpendicular to the hollow portion 20d from the other end of the engaging portion 20b of a bypass valve element 20A at a prescribed interval. The term prescribed interval used herein means the distance where the piston 16 most shrinks, the end portion 20e of the bypass valve element 20A being inserted into the bypass channel 3A and the bypass pores 20c and 20c not being blocked by the inner wall surface 19g of the joint cover 19. The bypass pores 20c and 20c have a diameter big enough for securing the flow amount of the cooling liquid from the bypass channel 3A.

The length of the bypass valve element 20A in the shaft direction is such that, on one hand, when the piston 16 most shrinks, the end of the bypass valve element 20A is inserted into the bypass channel 3A and the bypass pores 20c and 20c are not blocked by the inner wall surface 19g of the joint cover 19, while, on the other hand, when the piston 16 most expands, the bypass valve element 20A is inserted into the bypass channel 20A, and the bypass pores 20c and 20c are perfectly blocked by the inner wall surface 19g of the joint cover 19.

Irrelevant of the movement of the piston 16, the bypass valve element 20A is always inserted into the bypass channel 3A. However, due to the movement of the piston 16, the bypass pores 20c and 20c are opened or closed within the inner wall surface 19g of the joint cover. At this time, the outer circumference 20a of the bypass valve element 20A slides in contact with the inner wall surface 19g of the joint cover 19. In addition, the bypass valve element 20A and the piston 16 move together with each other on the same axis. For this reason, when the piston 16 moves, it can stably actuate without blurring the shaft of the piston. Consequently, the thermostat 1A can actuate in much more stable manner than the thermostat 1 of the first embodiment does. As a result, when the piston 16 expands, the piston 16 and the guide portion 11 can be prevented from being worn in a bias manner, and dust etc. are never incorporated into the piston 16 and the guide portion 11. Moreover, the thermostat 1A is free from wear generated when the bypass valve element 20A is inserted into the bypass channel 3A, as in the case of the thermostat 1 of the first embodiment.

Since how to fit the thermostat 1A to the engine head 2 is the same as that of the first embodiment, the description thereof is omitted.

The functions of the thermostat 1A will now be described by referring to FIG. 4 and FIG. 5.

(1) Functions of Thermostat 1A at the Time of Cooling fluid Having Low Temperature or of Starting Warming-up of Engine At the time when the cooling fluid has a low temperature or before the engine is warmed up, the temperature of the cooling fluid within the cooling fluid channel 3 is low, and the wax 15a within the wax case 15 is in a shrunken form. At this time, a resilient force is always applied to the thermo valve 7 in an upward direction by the coil spring 6. For this reason, the valve element 12 of the element 10 closes the inlet opening 17a and the outlet opening 17b of the valve body 17, and also opens the bypass opening 17g. In addition, the bypass pores 20c and 20c of the bypass valve element 20A are set free from the inner wall surface 19g of the joint cover. To be specific, the fluid channel area FA is blocked and, thus, the cooling fluid never flows from the radiator side to the engine side. On the other hand, the bypass channel 3A and the bypass opening 17g are communicated with each other via the hollow portion 20d of the bypass valve element 20A, the bypass pores 20c and 20c and the hollow portion of the valve body 17. Consequently, the cooling fluid flows from the bypass channel 3A to the engine side (see the arrow in FIG. 4). Consequently, the cooling fluid is circulated within the engine not via the radiator (see FIG. 4).

The temperature of the engine is increased with the elapse of time and, thus, the temperature of the cooling fluid within the cooling fluid channel 3 is increased accordingly. This makes the wax 15a within the wax case 15 expand, and increase its volume. At this time, a change in the temperature of the cooling fluid flowing from the bypass channel 3A is directly transmitted to the wax case 15, which is a thermal sensitive portion. Through the expansion of the volume of the wax 15a, the diaphragm 15b is deformed to an upward direction and pushes the rubber piston 15d up via the semi-fluid 15c according to the move-up change of the diaphragm 15b. The moving up of the rubber piston 15d causes the piston 16 to be pushed up via the backup plate 15e. To be specific, the piston 16 will project out from the guide portion 11 of the element 10 (see FIG. 5).

However, since the contact portion 16a which is an end of the piston 16, is always in contact with the contact surface 18g of the metal fitting 18a of the cap member 18, the guide portion 11 and thus, the elements, actually descend. At this time, as the element 10 descends, the bypass valve element 20A is inserted into the bypass channel 3A of the joint cover 19. For this reason, when the piston 16 is extended, the piston 16 stably actuates without blurring the shaft.

Figure 5:
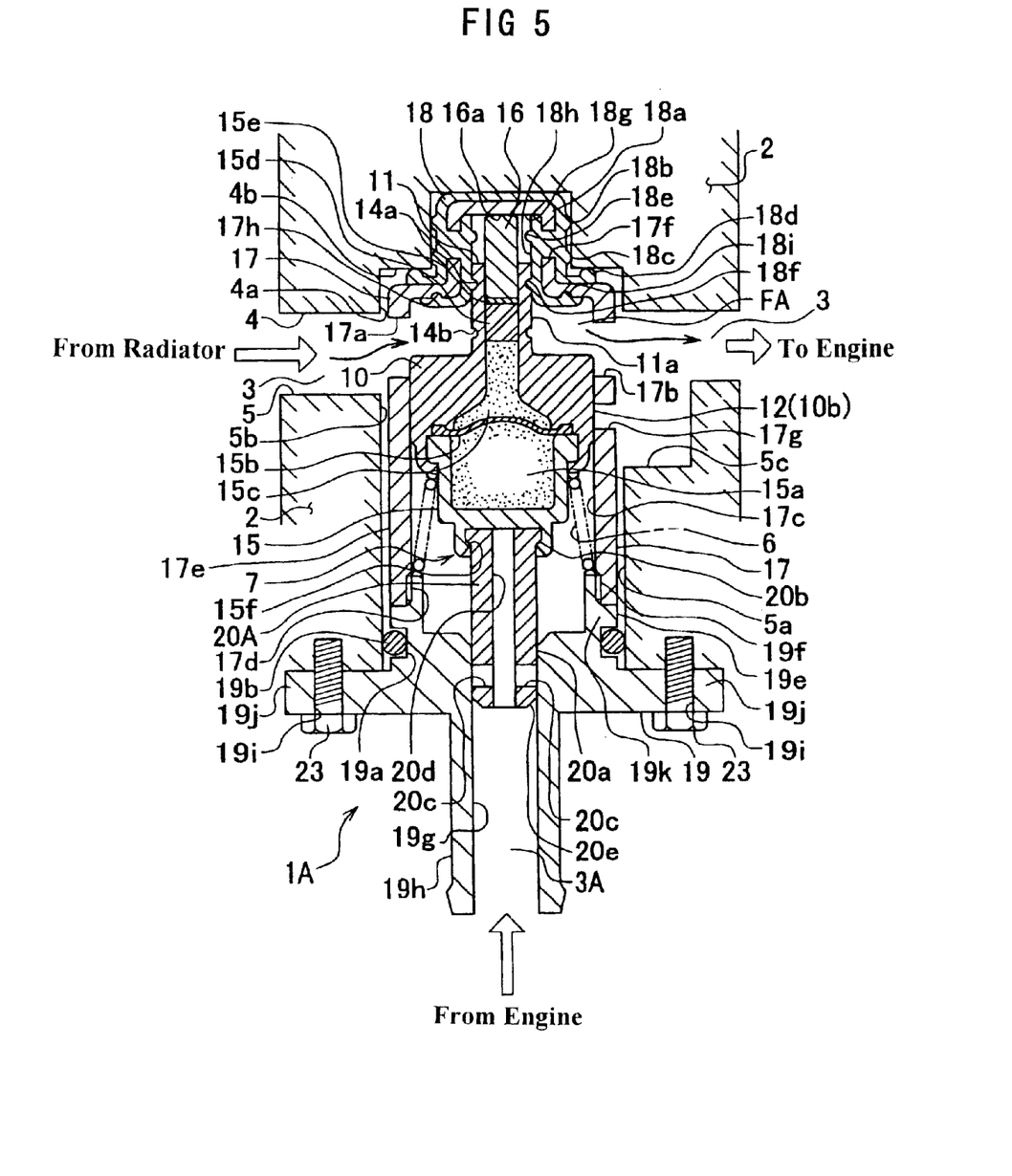
FIG. 5 is a cross sectional view showing the opened state of the valve in the thermostat according to the second embodiment of the present invention.

In addition, the circular groove 14a of the guide portion 11 which engages with the lip portion 18e of the cap member 18 (see FIG. 4) descends along the inner wall surface 18h of the cap member 18, and finally engages with the lip portion 18f of the cap member 18 (see FIG. 5). The position of the lip portion 18f formed by the projection is a position for determining the final descending position of the element 10. On the way from the lip portion 18e to the lip portion 18f, another lip portion may be formed to enhance the prevention of the cooling fluid from the penetration into the gap portion between the guide portion 11 and the piston 16.

When the thermo valve descends 7 in a slidable manner, the valve element 12 of the element 10 causes the inlet opening 17a and the outlet opening 17b of the valve body, which are in closed states, to be opened. To be specific, the fluid channel area FA is communicated so that the cooling fluid flows from the radiator side to the engine side (direction of the arrow in FIG. 5) (See FIG. 5). Then, the cooling fluid, having been cooled by the radiator, passes through the cooling fluid channel 3 and flows into the engine. At this time, since the change in the temperature of the cooling fluid is transmitted to the wax case 15, which is a thermal sensitive portion, via the valve element 12 of the element 10, the cooling fluid, having been cooled at the radiator side, does not shrink the wax 15a suddenly.

When the thermo valve 7 ascends in a slidable manner, the valve element 12 of the element 10 causes the bypass opening 17 of the valve body 17 which is in the opened state to be closed and the bypass pores 20c and 20c of the bypass valve element 20A are closed by the inner wall surface of the joint cover 19. To be specific, the bypass channel 3A and the bypass opening 17g are blocked and, thus, the cooling fluid never flows to the engine side via the bypass channel 3A (see FIG. 5).

(2) Functions of Thermostat 1A according to Change in Temperature of Cooling fluid from High Temperature to Low Temperature When the engine is stopped, the actuation of the water pump is stopped, and the circulation of the cooling fluid within the cooling fluid channel 3 is also stopped. Then, with elapse of time, the temperature of the cooling fluid is decreased. Subsequently, as the temperature of the cooling fluid becomes lower, the wax 15a, which has expanded, shrinks. At this time, since the temperature change of the cooling fluid flowing from the radiator side via the valve element 12 of the element 10 is transmitted to the wax case 15 which is a thermal sensitive portion, the shrinkage of the wax 15a is brought about slowly. Furthermore, by means of the coil spring 6 which always applies a resilient force to the thermo valve 7 in an upward direction, the thermo valve 7 slides upwardly. As a result, the valve element 12 of the element 10 closes the inlet opening 17a and the outlet opening 17b of the valve body 17, which are in opened state, and opens the bypass opening 17g. In addition, the bypass pores 20c and 20c of the bypass valve element 20A are set free from the inner wall surface 19g of the joint cover. To be specific, the fluid channel area FA is blocked and, thus, the cooling fluid never flows from the radiator side to the engine side (see FIG. 4). On the other hand, the bypass channel 3A and the bypass opening 17g are communicated with each other via the hollow portion 20d of the bypass valve element 20A, the bypass pores 20c and 20c and the hollow portion 20d of the bypass valve element 20A and the hollow portion of the valve body 17. Consequently, the cooling fluid flows from the bypass channel 3A to the engine side. Consequently, the cooling fluid is circulated within the engine not via the radiator (see FIG. 4).

Since the temperature change of the cooling fluid flowing from the radiator side is transmitted via the valve element 12 of the element 10 to the wax case 15, which is a thermal sensitive portion, the volume of the wax 15a changes slowly. For this reason, the cooling fluid which has been cooled from the radiator side flows and, thus, the wax 15a never shrinks suddenly. As a result, it does not tend to generate the haunting phenomenon of the valve element 12 continuously and repeatedly opening and closing the outlet opening 17b and the inlet opening 17a.

According to the thermostat of the present invention, since a thermo valve having a piston and a bypass valve are unified with each other, the bypass valve moves according to the movement of the piston. In addition, since the bypass valve is configured so as to be inserted into the bypass channel, no blurring of the shaft is brought about when the piston is expanded. For this reason, the piston and the guide portion can be prevented from being worn in a bias manner, leading to an increase in the durability of the thermostat.

Moreover, since the thermostat is configured so that the valve element and the bypass valve element move according to the movement of one piston, the bypass channel can be formed from a smaller number of parts.

The present invention is not restricted to the embodiments described above, and can be carried out in various manners. For example, while the valve body and the joint cover are unified with each other in the embodiments, they can be formed separately. Also, while the thermostat is placed on the cooling fluid channel of the engine head in the embodiments, it can be placed on any appropriate portion of the cooling fluid channel.

What is claimed is:

1. A thermostat comprising:
a valve body having an inlet opening, an outlet opening and a bypass opening formed on a circumference surface thereof and a fluid channel area communicating said inlet opening with said outlet opening within said valve body, said inlet opening and said outlet opening communicating with a cooling fluid channel, said bypass opening communicating to said cooling fluid channel and a bypass channel within said valve body;

a thermo valve provided in said valve body and configured to open and close communication between said inlet opening and said outlet opening and communication between said bypass opening and said bypass channel based on expansion and reduction of a thermal expansion element configured to thermally expand and reduce volume thereof;

a spring provided in said valve body and configured to urge said thermal expansion element to be compressed; and a joint cover configured to cover an end portion of said valve body and communicating with said bypass channel, wherein said joint cover has a bypass channel portion communicating with said bypass channel; and wherein said bypass valve is engaged with said bypass channel portion and configured to slide along said bypass channel portion based on the movement of said piston to open and close said communication between said bypass opening and said bypass channel.

2. The thermostat of claim 1, wherein said thermo valve comprises:
a piston configured to move based on said expansion and reduction of said thermal expansion element;

a valve element configured to open and close said communication between said inlet opening and said outlet opening based on movement of said piston; and a bypass valve configured to open and close said communication between said bypass channel and said bypass opening based on said movement of said piston.

3. The thermostat of claim 2, wherein said thermo valve has said valve element on an one end portion and said bypass valve on an opposite end portion.

4. The thermostat of claim 1, wherein
said thermo valve is configured to open said communication between said inlet opening and said outlet opening and close said communication between said bypass opening and said bypass channel when said thermal expansion element thermally expands volume thereof; and said thermo valve is configured to close said communication between said inlet opening and said outlet opening and open said communication between said bypass opening and said bypass channel when said thermal expansion element thermally reduces volume thereof.

5. The thermostat of claim 1, wherein said thermally expandable element comprises a wax.

6. The thermostat of claim 2, wherein said bypass valve is configured to plug and unplug said bypass channel to open and close said communication between said bypass opening and said bypass channel.

7. The thermostat of claim 1, wherein said joint cover is configured to engage with said valve body by screwing.

8. The thermostat of claim 1, wherein said joint cover is configured to cover an opening from which said thermostat is inserted.

9. The thermostat of claim 1, wherein:
said bypass valve has a hollow portion inside said bypass valve and at least one bypass pore on an outer surface of said bypass valve;

said hollow portion is communicating with said bypass channel portion and said at least one bypass pore; and said at least one bypass pore being configured to open and close said communication between said bypass opening and said bypass channel according to a position of said bypass valve.

10. An internal combustion engine comprising the thermostat of claim 1.

11. A vehicle comprising the thermostat of claim 1.

12. A cooling system comprising the thermostat of claim 1.

* * * * *

UNITED STATES PATENT AND TRADEMARK OFFICE
CERTIFICATE OF CORRECTION

PATENT NO. : 6,457,652 B1
DATED : October 1, 2002
INVENTOR(S) : Fukamachi et al.

It is certified that error appears in the above-identified patent and that said Letters Patent is hereby corrected as shown below:

<u>Title page,</u>
Item [73], Assignee should read:

-- [73] Assignees: Honda Giken Kogyo Kabushiki Kaisha, Tokyo (JP); Nippon Thermostat Co., Ltd., Tokyo (JP) --

Signed and Sealed this

Fourth Day of February, 2003

JAMES E. ROGAN
*Director of the United States Patent and Trademark Office*